Oct. 28, 1941.  C. M. JOHNSON  2,260,456
METHOD OF AND APPARATUS FOR FORMING ROUGE PADS
Filed July 20, 1939  3 Sheets-Sheet 1
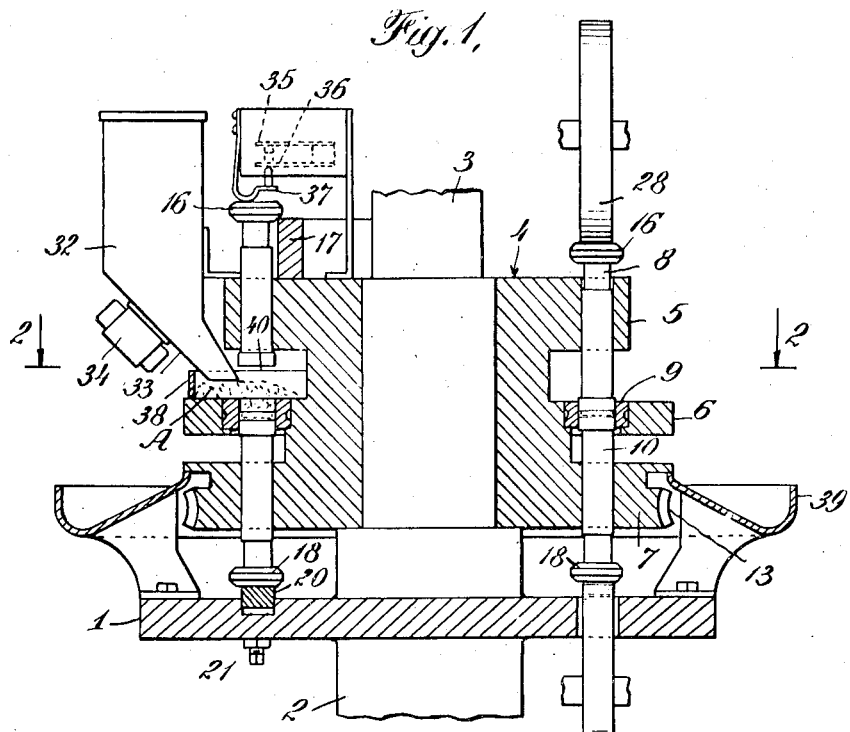
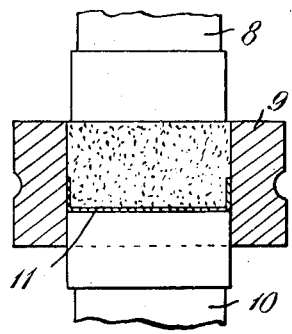
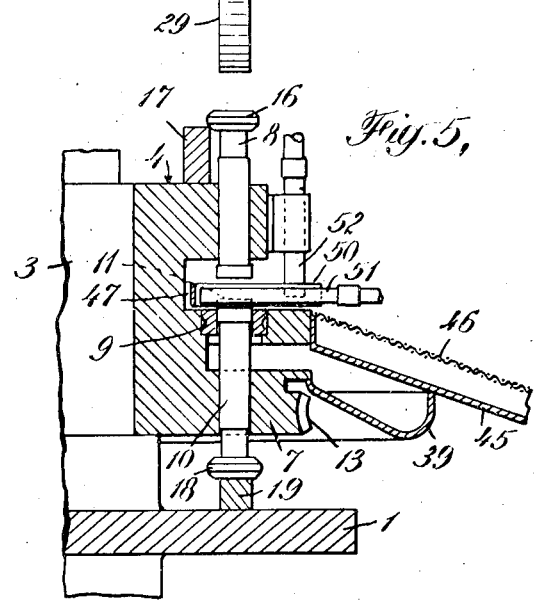
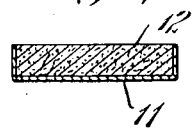
INVENTOR
Clifford M. Johnson
BY
Pennie, Davis, Marvin & Edmonds
ATTORNEYS

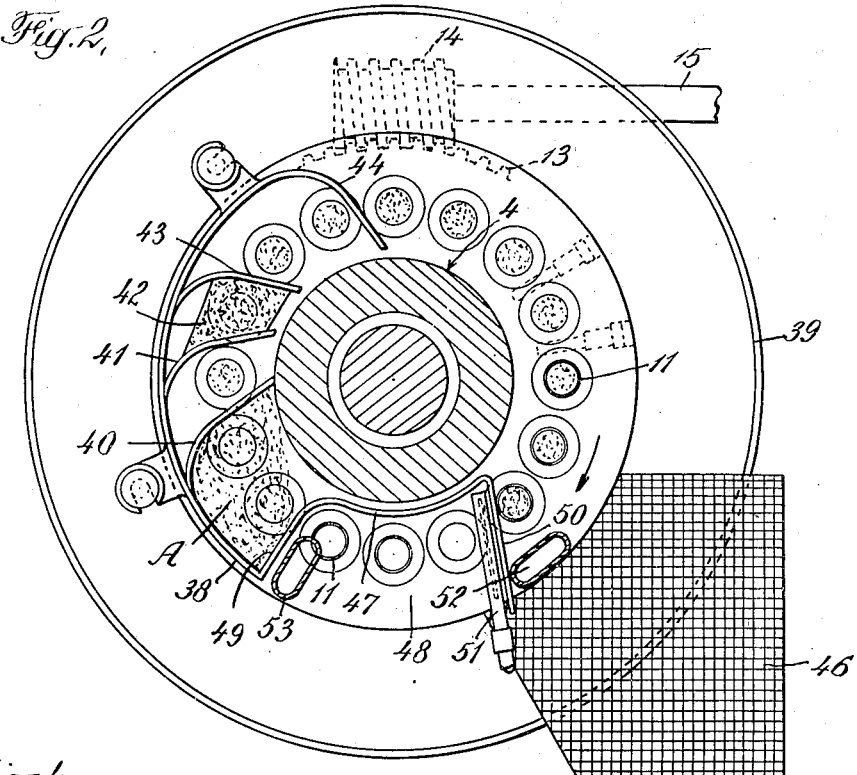
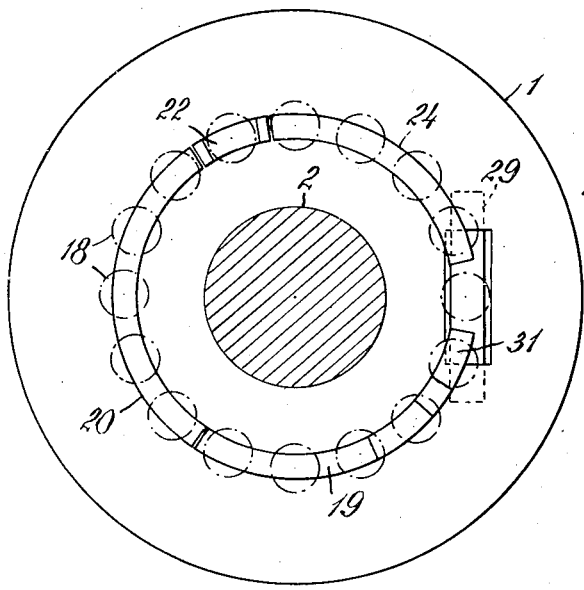
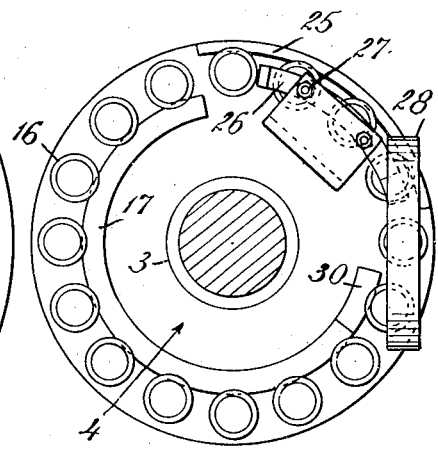

Oct. 28, 1941.　　　C. M. JOHNSON　　　2,260,456
METHOD OF AND APPARATUS FOR FORMING ROUGE PADS
Filed July 20, 1939　　　3 Sheets-Sheet 3

INVENTOR
Clifford M. Johnson
BY
Pennie, Davis, Marvin & Edmonds
ATTORNEYS

Patented Oct. 28, 1941

2,260,456

UNITED STATES PATENT OFFICE 2,260,456

METHOD OF AND APPARATUS FOR FORMING ROUGE PADS

Clifford M. Johnson, Suffern, N. Y., assignor to Allied Products, Inc., New York, N. Y., a corporation of New York Application July 20, 1939, Serial No. 285,555

6 Claims. (Cl. 18—20)

This invention relates to a method of and apparatus for manufacturing rouge pads and more particularly to a method whereby finely powdered material, such as rouge, may be compressed into a cake or pad.

In the manufacture of rouge pads, such as are used in compacts, considerable difficulty is encountered in compressing the fine powder which is employed into a pad or cake. Heretofore hand presses have been employed for this purpose. One operator fills a number of the pans in which the pads are placed and a second operator places a number of these pans under a hand press by means of which pressure may be very gradually applied to them and all of the entrapped air permitted to escape from the powder. The labor involved in the manufacture of rouge pads in this manner is a major item in the cost of producing the pads.

It has heretofore been considered impossible to compress finely powdered material such as rouge powder on rotary presses. To produce a satisfactory pad it is necessary to get all of the air out of the powder as entrapped air will cause the pad to fracture. It has heretofore been believed that a material must contain about 18 percent of granules to permit it to be compressed on the rotary presses that have heretofore been available. It is impossible to employ granules in the manufacture of rouge pads because at the pressures employed the granules are not caused to flow together resulting in the production of a gritty product.

I have found that I can successfully compress rouge for the production of rouge pads by the application of a gradual pressure and by permitting the die containing the pad to be pressed to drop or fall suddenly to remove all air from the powder. Instead of the conventional rotary presses wherein there is a quick application of pressure, I employ a modified form of press in which additional cams are provided for gradually applying the desired pressure over a considerable portion of the path of travel of the die and plungers whereby the pressure is so applied that no entrapped air remains in the product and the rouge pad produced is satisfactory in all respects.

The invention further comprises means for feeding the rouge or other powdered material to the dies in which a vibrator is attached to the hopper or scoop from which the rouge or other powdered material is delivered and the vibrator is energized at proper intervals, coordinated with the operation of the machine whereby packing or caking of the material in the mouth of the hopper or scoop is prevented.

In carrying out my invention I provide a machine having a rotating head with a plurality of dies arranged therein and with top and bottom plungers associated with each die. At the beginning of a revolution a metal pan is inserted in the die on the lower plunger by an operator. The head then passes into proximity with the spout of a container for the powdered material and a quantity of material is delivered from the spout to the surface of the head. Stationary members are arranged adjacent the point of delivery of the powdered material to feed the material into the die. As the head revolves the excess material is removed and a predetermined quantity of material suitable for preparation of a pad remains in the die. During the latter portion of the revolution the upper and lower plungers pass over cam tracks which gradually incline toward the die so that a gradual pressure is applied to the powdered material in the die throughout an appreciable portion of the revolution. This gradual pressure compresses the material slowly and permits all entrapped air to escape therefrom. The plungers then pass over rollers where the final pressure is applied and the top plunger is then removed from the die. After the removal of the top plunger, the lower plunger is moved upwardly in the die to eject the finished product.

In the accompanying drawings I have shown one embodiment of the invention. In this showing:

Fig. 1 is a vertical, sectional view of a rotary press employed in carrying out my invention and forming a part of the invention;

Fig. 2 is a horizontal, sectional view on line 2—2 of Fig. 1 looking in the direction of the arrows;

Fig. 3 is a detailed, sectional view of the machine showing the top cams;

Fig. 4 is a similar view showing the bottom cams;

Fig. 5 is a detailed, vertical, sectional view of the machine adjacent the discharge point;

Fig. 7 is an enlarged sectional view of one of the dies and its cooperating upper and lower plungers; and Fig. 8 is a sectional view of the product.

Figure 6:
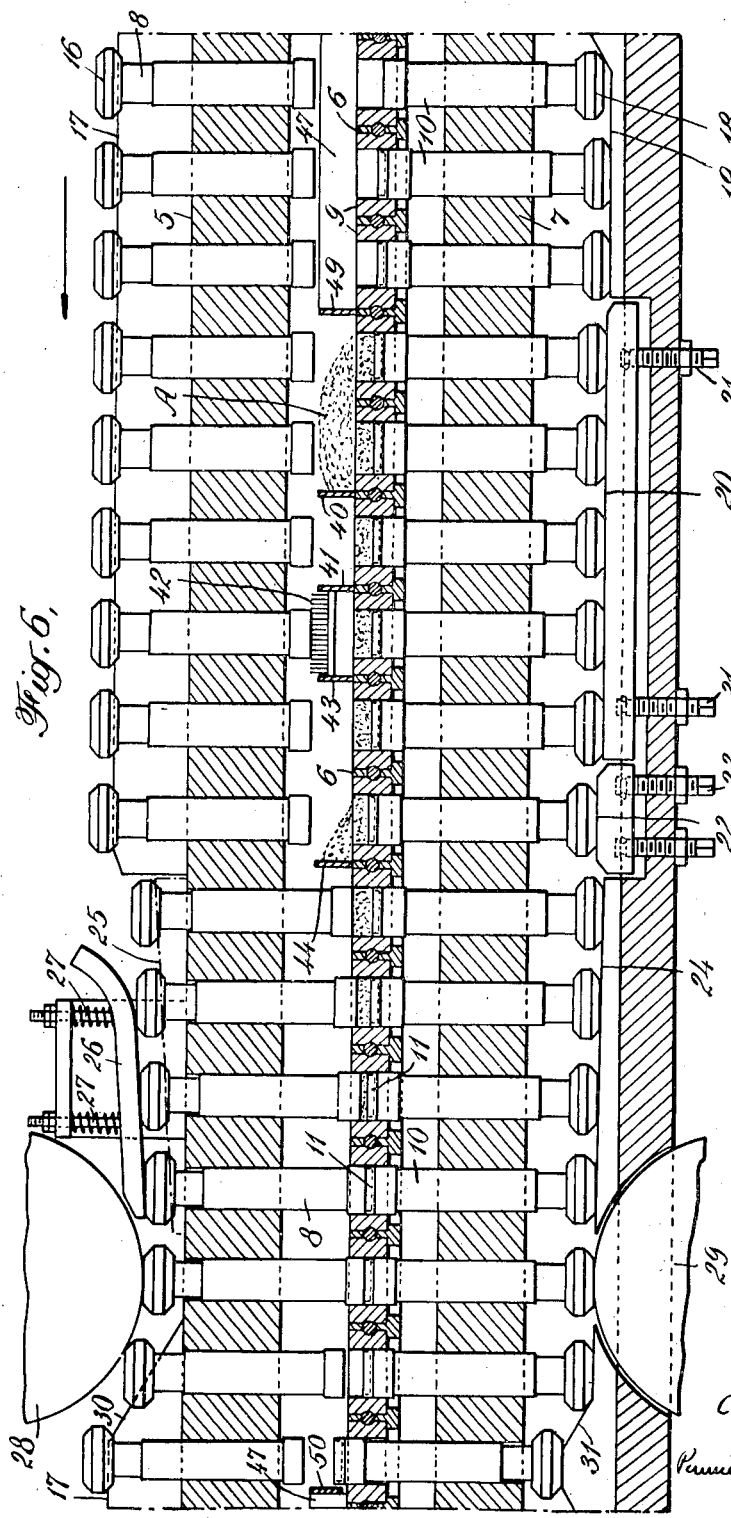
Fig. 6 is a diagrammatic development of the cams and associated dies and plungers.

Referring to the drawings, the reference numeral 1 designates the bed or table of a rotary press having a central bearing 2 for the reception of a shaft or spindle 3. A rotary member 4 is mounted on the shaft or spindle 3 and this rotary member carries the dies and plungers. As shown the rotary member is provided with an upper section 5 which supports the upper punches, an intermediate section 6 which supports the dies, and a lower section 7. These sections are provided with a plurality of aligned circumferentially disposed openings. The openings in the member 5 receive upper plungers 8. The openings in the intermediate section 6 receive dies 9 and the openings in the lower section 7 receive plungers 10.

The dies are of the proper size to receive shallow metal pans 11 (see Fig. 8) which are adapted to be filled with rouge powder and compressed into a pad or cake 12.

The member 4 is rotated on shaft 3 in any suitable manner and plungers 8 and 10 cooperate with suitable cams which are stationary and mounted on the frame of the machine to suitably compress the powder in the pans 11. As shown, the peripheral edge of the lower member 7 may be provided with a worm wheel 13 driven by a worm 14 mounted on a drive shaft 15. The plungers 8 and 10 are adapted to enter into and recede from the dies 9 to properly compress the powder in the pans 11. Operation of the plungers is controlled by a series of cams. Referring to Fig. 6 of the drawings at the beginning of a revolution where the pans 11 are inserted in the dies by the operator, upper plungers 8 are retained in a raised position out of the dies. As shown the upper plungers are provided with enlarged heads 16 which engage a stationary cam track 17 on the frame of the machine. At this time the heads 18 of the lower plungers are in engagement with a cam 19 carried on the table 1 and are at their lowest position. As a die and its associated pair of plungers move around the machine, the powdered material is fed into the die and the lower plungers are raised by a cam member 20 which is adjustably mounted on the table of the machine by means of adjusting screws 21. At a further point in the revolution of the machine the lower plungers engage a cam track 22 further raising the lower plungers. The position of this track is also adjustable and is controlled by adjusting screws 23. From the track 22 the heads 18 of the lower plungers pass to a cam track 24 which has a very gradual incline. At the beginning of this track the lower plungers are in their lowermost position and at the same time the upper plungers pass off of the cam or track 17 to a gradually inclined track 25. As shown in Fig. 6 the upper plungers enter the top of the die at this point and as the cam tracks 24 and 25 move the plungers toward each other the powdered material is gradually compressed. Positive pressure is applied during the latter portion of this section of the machine to the top plungers by a cam 26 which engages the tops of the enlarged head 16 of the upper plungers and which is spring-pressed as shown at 27. Final pressure is applied to the upper and lower plungers by cam wheels 28 and 29 and after passing the upper cam wheel 28 the heads of the upper plungers engage a sharply inclined track 30 to quickly remove the upper plungers from the dies. At about the same time the heads of the lower plungers pass over sharply inclined cam track 31 which raises the lower plungers to the top of the dies to eject the finished rouge pad from the die.

The powder from which the rouge pad is formed is fed from a hopper 32 on to the upper surface of the intermediate section 6 of the rotating head. It has heretofore been difficult to feed powdered material in regulated amounts from a hopper without having the material cake in the spout 33. To overcome this I provide a vibrator 34 on the spout and this vibrator is arranged in a circuit with a stationary contact 35 and a movable contact 36 arranged on the frame of the machine. The movable contact is mounted on a spring arm 37 which is adapted to be engaged by the head of each of the upper plungers as the plunger passes under the arm 37 to close the contacts and energize the vibrator. This results in delivery of a quantity of the powdered material on to the upper surface of the intermediate section 6 of the head as indicated at A in Figs. 1 and 6 of the drawings. At this time the upper plungers are out of the dies and the lower plungers are traveling over the cam track 20 in a slightly elevated position. A guard 38 is arranged over the upper surface of the intermediate section 6 of the head to prevent excess powder from falling from the surface 6 to other parts of the machine. A trough 39 surrounds the head 4 to catch any powder that may be spilled from the surface 6. The guard 38 extends along the edge of the intermediate section for a slight distance and then extends inwardly toward the center of the machine as indicated at 40. In the movement of the head the powder is thus brought against the inwardly extending section 40 and caused to enter the die. A similar guard member 41 is slightly spaced from the guard 40 and acts as an additional means for scraping powder from the head and delivering it into the die pockets. Immediately beyond the guard 40 there is provided a brush 42 for cleaning the lower surface of the upper dies so that in the compression of the powder it will be provided with a clean upper surface. Another scraper 43 is provided just beyond the brush 42. Shortly after passing the scraper 43 the lower plunger is slightly raised by cam track 22 which causes part of the powder in the die to be moved out of it on to the upper surface of the section 6. While in this raised position the die then passes under a graduator 44 which removes excess powder and leaves a predetermined quantity in the die. Immediately after passing the graduator 44 the lower plunger drops suddenly by passing from the cam track 22 to the cam track 24 and this operation materially assists in release of entrapped air from the powder. The lower plunger is lowered while the upper plunger is still out of the die. Immediately thereafter the head 16 of the upper plunger passes off of the end of the track 17 to the track 25. This is an abrupt drop as shown in Fig. 6 of the drawings and the movement of the upper plunger into the die has a further tendency to remove entrapped air from the powder. The area of the plunger is slightly less than the area of the die as shown in Fig. 7 of the drawings and this facilitates escape of air around the periphery of the plunger. The upper and lower plungers are then brought toward each other gradually by cam tracks 24, 25 and 26 to slowly compress the rouge powder and to permit time for escape of any entrapped air during the final compression. The dies then pass the cam wheels 28 and 29 and the final compression is applied to the pads.

After the dies have passed the cam wheels 28 and 29 the upper plungers are quickly raised from the tops of the dies by cam track 30 and the lower plungers are then raised by cam track 31 to the top of the dies to eject the finished pads. The pad travels down an inclined member 45 which is provided with an upper surface 46 formed of screen wire whereby any loose powder is permitted to pass through the screen to the inclined member 45 and is conveyed to a suitable receptacle. Beyond the point of delivery of the finished pads the guard member 38 is arranged at the inner side of the dies as indicated at 47 and a number of stations, shown as 3 in Fig. 2 of the drawings, are provided for a loading station 48. The guard section 47 extends outwardly at each end as indicated at 49 and 50. A suction pipe 51 extends across the machine adjacent the guard section 50 and a similar suction member 52 is arranged on the opposite side of the guard section 50 at the point of delivery of the finished pads. Another suction member 53 may also be arranged at the other end of the filling station.

At the filling station, which is indicated by the first three dies and plungers in Fig. 6 of the drawings, an operator places a pan 11 in each of the dies. The associated die and pair of plungers then pass to the section of the machine immediately under the hopper 32 and a quantity of rouge powder is delivered on to the surface of section 6 as each upper plunger moves the spring arm 37 upwardly to close the contacts 35 and 36 and energize the vibrator 34. The powder is forced into the dies from the upper surface of the section 6 by the guards 40, 41 and 43 as the head revolves and the upper surface of the section 6 passes under these guards and with the lower plunger heads riding over the cam track 20 a slight excess of powder is delivered to each of the dies. When the lower plunger rides upon the cam 22 and is slightly raised, this excess is forced out of the die and is removed by the graduator 44. The dies 9 are shown as separable from the intermediate section 6 and mounted therein. This is to provide a machine which is capable of making rouge pads of a number of sizes. By employing removable dies, the proper sized die and the proper sized pans 11 may be used for making various size pads. If a machine is to be constructed in which all of the rouge pads would be of the same size, the dies could be made integral with the head. Similarly the cam sections 20 and 22 are shown adjustable to permit pads of different thicknesses to be made.

While the apparatus described is generally similar to rotary presses heretofore employed with modifications of structure for the application of gradual pressure to the powdered material contained in the dies, the apparatus as shown is capable of compressing powdered material which has heretofore been impossible in machines in which all of the pressure is quickly applied by the cam wheels 28 and 29. By first removing a portion of the entrapped air by causing the lower plunger to fall as it passes from the cam 22 to the cam track 24 and by then gradually applying the pressure by cam tracks 24, 25 and 26, I am able to compress powdered materials and release entrapped air which has heretofore been impossible on rotary machines of this character.

I claim:

1. Apparatus of the character described comprising a rotating head, a plurality of dies mounted in the head, upper and lower plungers associated with each of the dies, means for delivering powdered material to the dies, means for removing excess material therefrom, tracks engaging said plungers to position said plungers throughout the revolution of said head, the track of the lower plungers being provided with an abrupt drop to permit the lower plunger and the material supported thereon to move downwardly to remove entrapped air from the material, the upper and lower tracks being inclined toward each other and extending an appreciable portion of the circumference of the machine beyond the abrupt drop to apply gradual pressure to the top and bottom of the material in the die.

2. Apparatus of the character described comprising a rotating head, dies mounted in the head, upper and lower plungers associated with each of the dies, means for delivering powdered material to the dies, upper and lower tracks engaging said plungers, the lower track being constructed to retain the lower plunger in a raised position to support the material in the die, the upper track retaining the upper plunger out of the die during delivery of material thereto, means for raising the lower plunger to remove excess material from the die, inclined portions in said tracks extending an appreciable portion of the machine for gradually applying pressure to the top and bottom of the material in the die, and cam wheels engaging the upper and lower dies to apply final pressure to the material in the die.

3. Apparatus of the character described comprising a rotating head, dies mounted in the head, upper and lower plungers associated with each of the dies, means for delivering powdered material to the dies, tracks extending throughout the circumference of the machine for actuating the plungers, the lower track being provided with a portion for supporting the lower plunger in the die in a slightly raised position to support the material fed thereto and being provided with a lowered portion to permit the plunger to move downwardly abruptly to cause escape of entrapped air, the upper and lower tracks being provided with inclined portions extending an appreciable portion of the machine beyond the lowered portion of the lower track to gradually apply pressure to the material in the die.

4. The method of forming rouge pads which comprises placing an excess of powdered rouge in a die with the bottom of the die closed and the top of the die open, moving the bottom of the die upwardly to remove excess material from the die, closing the top of the die, and then simultaneously exerting a gradual pressure on the top and bottom of the die for an appreciable period of time to permit entrapped air to escape and to compress the rouge into a pad.

5. The method of forming rouge pads which comprises placing an excess of powdered rouge in a die with the bottom of the die closed and the top of the die open, removing excess material from the die, moving the bottom of the die abruptly downwardly to remove entrapped air from the powdered rouge, closing the top of the die, and gradually applying pressure to the top and bottom of the die through an appreciable period to permit any remaining entrapped air to escape and to compress the rouge into a pad.

6. The method of forming rouge pads which comprises placing an excess of powdered material in a die with the bottom of the die closed and the top of the die open, moving the bottom of the die upwardly to remove excess material, moving the bottom of the die abruptly downwardly to permit escape of entrapped air, closing the top of the die, and then gradually applying pressure simultaneously to the top and bottom of the die through an appreciable period to permit any remaining entrapped air to escape and to compress the rouge into a pad.

CLIFFORD M. JOHNSON.